United States Patent [19]

Svoboda

[11] Patent Number: 4,756,683

[45] Date of Patent: Jul. 12, 1988

[54] DEVICE FOR PRESSURE-AIDED MOLDING, ESPECIALLY INJECTION MOLDING OF SHAPED BODIES

[75] Inventor: Bruno Svoboda, Vienna, Austria

[73] Assignee: Vereinigte Edelstahlwerke Aktiengesellschaft (VEW), Vienna, Austria

[21] Appl. No.: 877,357

[22] Filed: Jun. 23, 1986

[30] Foreign Application Priority Data

Jul. 3, 1985 [AT] Austria .................. 1969/85

[51] Int. Cl.⁴ .............................. A23P 1/00
[52] U.S. Cl. .................... 425/557; 425/559; 425/562; 425/565; 425/566; 425/575
[58] Field of Search ............... 425/145, 143, 149, 542, 425/547, 549, 557, 550, 559, 561, 562, 565, 566, 564, 567, 568, 569, 574, 571, 587, 575, 594

[56] References Cited

U.S. PATENT DOCUMENTS

| | | | |
|---|---|---|---|
| 3,813,014 | 5/1974 | Guevin | 425/547 |
| 4,422,842 | 12/1983 | Monnet | 425/561 |
| 4,427,353 | 1/1984 | Omiya et al. | 425/569 |
| 4,557,683 | 12/1985 | Meeker | 425/557 |

FOREIGN PATENT DOCUMENTS 1779239  3/1978  Fed. Rep. of Germany .

*Primary Examiner*—Bernard Nozick
*Attorney, Agent, or Firm*—Werner W. Kleeman

[57] ABSTRACT

The device for pressure-aided molding of shaped bodies formed from high-molecular masses, preferably of small dimension, comprises at least one preparation chamber having at least one plasticizing or transport and mixing screw conveyor and at least one charging port for filling the preparation chamber with preferably thermally plasticizable and possibly molecularly cross-linkable molding mass. The preparation chamber flow communicates with a pressure-tight transition with at least one storage chamber for plasticized polymer. The storage chamber opens into at least one mold cavity filling conduit for charging a mold with molding mass. The device also comprises a drive mechanism for translatory-relative motion of the preparation chamber and the mold cavity filling conduit. The preparation chamber has at least one prolongation. The storage chamber is arranged forwardly of the prolongation in the transport direction of the plasticizing or transport and mixing screw conveyor and exhibits an inner wall with mutually substantially parallel generatrices. At least one mold injection nozzle is slidingly, sealingly, substantially translatably moveable within the storage chamber. The mold injection nozzle comprises at least a portion of the injection molding channel connectable to the mold and is substantially translatably moveable relative to the preparation chamber by means of the drive mechanism.

42 Claims, 1 Drawing Sheet

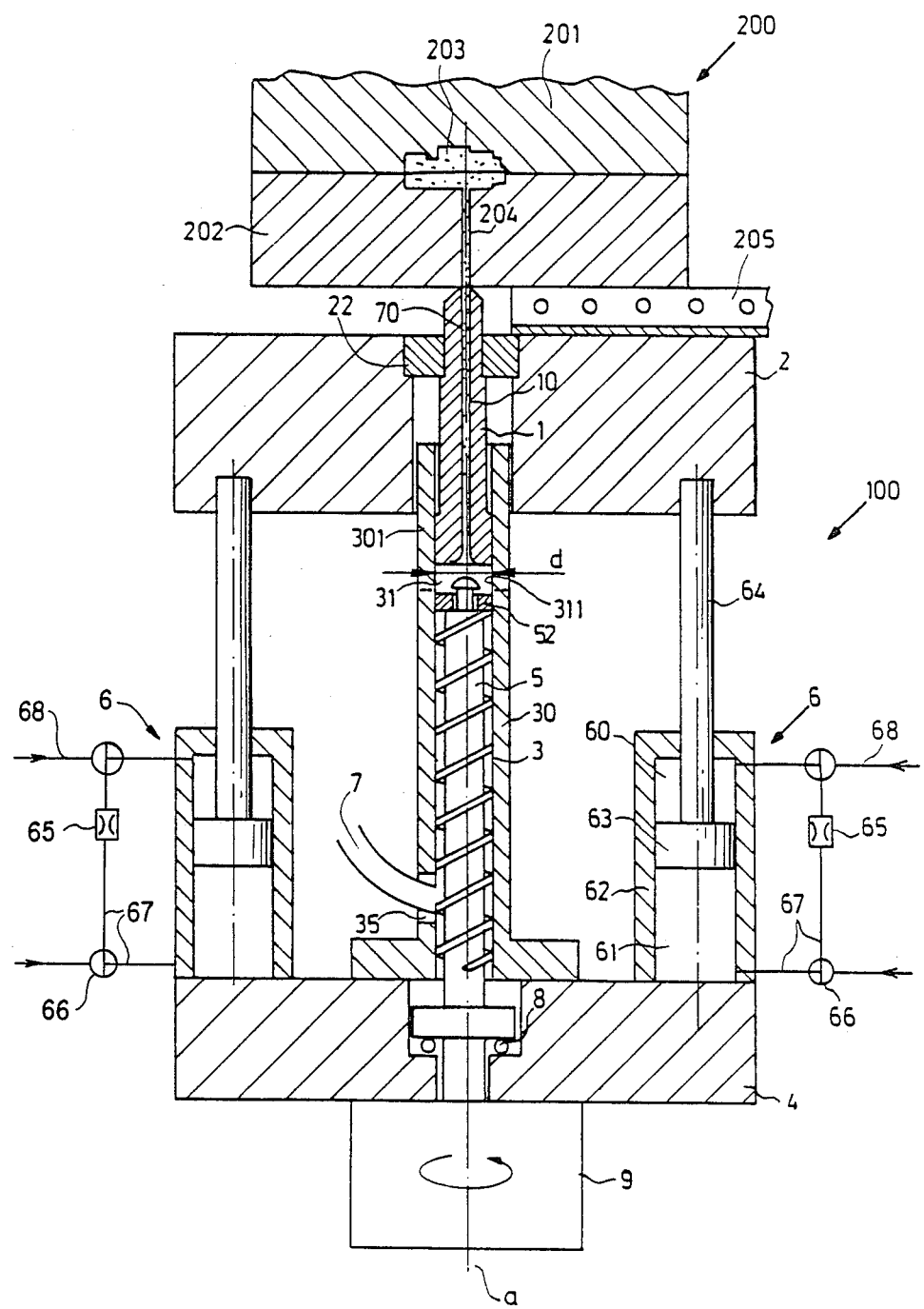

4,756,683

DEVICE FOR PRESSURE-AIDED MOLDING, ESPECIALLY INJECTION MOLDING OF SHAPED BODIES

BACKGROUND OF THE INVENTION

The present invention broadly relates to molding devices and, more specifically, pertains to a new and improved construction of a device for pressure-aided molding, especially injection molding of shaped or three-dimensional bodies.

In its more particular aspects, the invention concerns a device for pressure-aided molding, especially injection molding, of shaped bodies from high-molecular molding massive, especially polymers, such as synthetic rubber, natural rubber or latex, thermoplastic plastics and the like, and which bodies are preferably of small dimension. The device comprises at least one preparation chamber, especially a plasticizing chamber, comprising at least one rotatably driven conveying or transporting and mixing screw conveyor, especially a plasticizing screw conveyor arranged within the preparation chamber and having a transport direction and an axis of rotation. The device also comprises at least one charging port for filling the at least one preparation chamber with at least one preferably thermally plasticizable, possibly molecularly cross-linkable mass, especially a polymer, pre-polymer and/or a component of at least one polymer. The preparation chamber makes a pressure-tight transition into at least one storage chamber for plasticized polymer. The storage chamber, in turn, opens into at least one mold cavity filling conduit, preferably an injection molding channel, for charging at least one mold part of a mold or the like with the plasticizable molding mass. The, and preferably all, above-mentioned components or elements may be temperature adjustable. A device comprising a drive means, for instance a fluid medium drive means, is also provided. This drive device is provided for accomplishing translatory-relative motions of the preparation chamber and the mold cavity filling conduit, especially the injection molding channel, preferably in the direction of the axis of rotation of the transporting and mixing screw conveyor. The molding device can be especially advantageously employed for the fabrication of shaped bodies or three-dimensional bodies of small dimensions.

In other words, the device of the present invention is for pressure-aided molding, especially injection molding, of shaped or three-dimensional bodies having high-molecular masses, especially polymers such as synthetic rubber, natural rubber or latex, thermoplastics and the like, and which bodies are preferably of small dimension. The molding device comprises a preparation chamber defining a plasticizing chamber, at least one rotatably driven transport and mixing screw conveyor defining a plasticizing screw conveyor arranged within the preparation chamber and having a predetermined transport direction for the molding mass and a rotational axis and at least one charging port for filling the preparation chamber with at least one plasticizable molding mass. The preparation chamber makes a pressure-tight transition into at least one storage chamber for plasticized polymer. The molding device also comprises at least one mold cavity filling conduit for charging at least one mold cavity of a mold or the like with the molding mass. The storage chamber opens into the at least one mold cavity filling conduit. The, and preferably all, above-mentioned elements may be temperature-regulatable. The molding device also comprises a drive means. The drive device serves for accomplishing translatory-relative motions of the preparation chamber and the mold cavity filling conduit. This drive device is associated with the preparation chamber defining the plasticizing chamber and at least one prolongation or extension thereof. The drive device is associated with at least one storage chamber arranged subsequent to the preparation chamber in the transport direction of the transport and mixing screw conveyor and exhibits an inner wall with substantially mutually parallel generatrices.

From German Pat. No. 1,779,239, an injection molding device possessing a dosage or metering cylinder is known whose one end has a molding or injection opening which can be applied to the opening of an injection mold and in whose other open end, the end of a pressure piston constructed as a hollow piston can be translatably guided. An axially translatable conveying screw is mounted in the pressure piston. The axially translatable conveying screw is rotatable and is equipped with a displacement device which exerts an axial thrust on the axially translatable conveying screw in the direction of the dosage or metering cylinder. There are also provided stops for limiting the movement of the movable pressure piston during injection molding. It is thus known to fill at least one preparation chamber, especially a plasticizing chamber, comprising at least one rotatably driven conveying or transporting and mixing screw conveyor, especially a plasticizing screw conveyor, through at least one charging port with preferably thermally plasticizable, possibly molecularly cross-linkable polymer, pre-polymer and/or the components of at least one such polymer. Furthermore, in this arrangement the preparation chamber makes a pressure-tight transition into at least one storage chamber for the plasticized mass. The storage chamber opens into at least one mold cavity filling conduit, preferably an injection molding channel, for charging a mold part of a mold or the like with a mass to be molded. Preferably, all above-mentioned components are temperature adjustable. The known molding device also comprises a drive means, for instance a fluid medium drive means. This drive device also is provided for translatory-relative motions of the preparation chamber and the mold filling conduit, especially the injection molding channel, preferably in the direction of the rotational axis of the screw conveyor.

It is furthermore known, when injecting plastic masses, to move a substantially non-translatable screw conveyor located in the preparation chamber in a piston-like manner together with the preparation chamber into the storage chamber. The disadvantage of such a construction is that the body comprising the storage or transfer chamber and the injection channel connected to this body possesses an inner cross-section which must be substantially at least as great as the outer cross-section of the plasticizing cylinder possessing the conveying screw or screw conveyor. Especially during the fabrication of small components which require smaller injection volumes it is necessary, due to the large transfer-space cross-section, to keep the path of the piston formed by the conveying screw cylinder and conveying screw short during the injection molding procedure. In order to achieve a very exact dosing or charging as is required by injection molding, the control and regulation expenditure is high for precisely maintaining such a slight stroke during the injection molding procedure. In addition, susceptibility to breakdowns cannot be entirely avoided.

It is furthermore known to move an axially translatable, rotatably journaled conveying screw or screw conveyor located in the preparation chamber or plasticizing chamber through the stroke of the injection molding procedure in a piston-like manner within the preparation chamber or plasticizing chamber.

SUMMARY OF THE INVENTION

Therefore, with the foregoing in mind, it is a primary object of the present invention to provide a new and improved construction of a molding device for pressure-aided molding, especially injection molding, of shaped or three-dimensional bodies which does not exhibit the aforementioned drawbacks and shortcomings of the prior art constructions.

Another and more specific object of the present invention aims at providing a new and improved construction of a molding device for pressure-aided molding, especially injection molding, of shaped or three-dimensional bodies of the previously mentioned type for pressure assisted molding which does not possess the above-mentioned disadvantages and which permits or facilitates the fabrication of shaped or three-dimensional bodies of variously different and especially small dimensions, wherein the stroke of the molding device during an injection molding process has an extent with which high precision for the control of such stroke can be achieved without high equipment expenditure.

Yet another further significant object of the present invention aims at providing a new and improved construction of a molding device of the character described for pressure-aided molding, especially injection molding of shaped or three-dimensional bodies, which is relatively simple in construction and design, extremely economical to manufacture, highly reliable in operation, not readily subject to break-down or malfunction and requires a minimum of maintenance and servicing.

Now in order to implement these and still further objects of the invention, which will become more readily apparent as the description proceeds, the molding device of the present invention is manifested by the features that such device comprises a preparation chamber, especially a plasticizing chamber, having at least one prolongation or extension, if desired formed in one piece with the preparation chamber. The molding device also has a storage chamber arranged before the prolongation or extension as viewed in the transport direction of the transporting and mixing screw conveyor and exhibiting an inner wall with substantially mutually parallel generatrices. The device also comprises at least one mold injection nozzle which is slidingly, sealingly and substantially translatably moveable, especially displaceable, within the storage chamber. This mold injection nozzle comprises at least a portion of the mold injection conduit connectable to the mold, especially a portion of the injection molding channel. This mold injection nozzle is substantially translatably moveable relative to the preparation chamber by means of a drive, preferably by means of a fluid medium drive.

In other words, the molding device of the present invention is manifested by the features that it comprises at least one mold injection nozzle slidingly, sealingly, substantially translatably movable within the at least one storage chamber and comprising at least a portion of the mold cavity filling conduit operatively connectable to the mold and which mold injection nozzle is substantially movable relative to the preparation chamber by means of the drive means.

In the molding device of the present invention, the cross-section of the storage chamber or the transfer chamber for the volume of the molding mass to be injected into the mold is no longer minimally limited by the outer cross section of the screw conveyor cylinder. In a simplest case, the screw conveyor cylinder and its prolongation or extension can possess uniform inner cross-sectional areas. If the prolongation possesses an inner cross-section smaller than the preparation chamber, injection molded part or components, especially parts or components of lesser dimensions, can be obtained with high precision using a large stroke of the molding device. Furthermore, if, for example, the prolongation or extension and the plasticizing chamber can be separated from one another, high flexibility exists as does also the possibility, as before, of working with the cross-sectional area of the storage chamber which is larger than the cross-sectional area of the preparation chamber, whereby the molding device is not limited to the fabrication of small size molding parts or components. It is a special further advantage of the molding device of the present invention that with such device, the injection of molding masses is implemented according to the first-in/first-out principle. The material first conveyed into the storage chamber and its injection channel is also first injected into the mold. Thus the total material produces or defines a defined delay time or dwell time in the storage chamber, thus substantially reducing the danger of surplus molding mass or the like vulcanizing onto surfaces of the molding device. Production near to the Scoreh-point, which defines the start of vulcanization, is made possible, thus shortening the cycle time in comparison to previously known devices.

With the aforementioned advantages of flexibility, an embodiment is preferred in which the preparation chamber and its prolongation or extension and which preparation chamber possibly possesses an inner cross-sectional area different from that of the prolongation, are removeably connected to one another.

An arrangement which is especially only slightly prone to malfunctions and which is less complicated in construction and which is easily sealable even at the prevailing pressures of up to a few thousand bar, arises when a substantially joint or common axis is provided for at least two of, and possibly all, of the components constructed in conjunction with the conveying or transporting and mixing screw conveyor, especially with the plasticizing conveyor, with its rotary drive, with the preparation chamber, especially with the plasticizing chamber, with its prolongation, with the storage chamber, with the molding injection conduit body and with the mold injection conduit, especially with the injection channel. The advantage of such a co-axial arrangement furthermore exists in that flow paths are short and straight, so that only slight pressure losses arise, which, together with high injection pressures in the region of possibly a few thousand bar, enables a high mold injection pressure. Thus, the injection molding of even highly viscous, thermally sensitive plastic and rubber mixtures is substantially simplified or only now made possible. This has high economic significance, especially because it enables mixtures having special material characteristics to be processed, for example materials which possess difficult start-up properties.

A substantial mechanical simplification arises if the preparation chamber, especially the plasticizing chamber, and the conveying or transport and mixing screw conveyor located in this preparation chamber are substantially not, or are at most for a single mold closing procedure, translatably-relatively moveable toward each other in a longitudinal-path direction, preferably in the axial direction, for preventing a reverse or return flow of the molding mass. If the transport and mixing screw conveyor performs no or only a slight axial motion during a short stroke motion in the seat of a return flow prevention member cooperating with the forward end of the mixing screw conveyor, then the length-/diameter relation remains practically constant. In this manner the energy furnished by the transport and mixing screw conveyor also does not change, which results in an especially uniform heating and uniform viscosity of the plasticized molding mass.

In order to substantially prevent even a slight return flow of the plasticized molding mass under high pressure into the transport and mixing screw conveyor during injection molding, it is requisite for the exact or precise reproducibility of the volume to be molded that the conveying or transport and mixing screw conveyor, especially the plasticizing screw, exhibit in advantageous manner on, respectively in, its end region confronting the prolongation of the preparation chamber, especially the plasticizing chamber, a return flow prevention member, especially a non-return valve, or that such a return flow preventing member be associated with the end of the mixing screw conveyor on the preparation chamber side, for instance connected to the wall of the plasticizing chamber.

A particularly stable injection molding apparatus can be created if the mutually displaceable chambers for preparation and plasticizing and for storage are arranged essentially approximately within a yoke-like total construction. Especially if the transport and mixing screw conveyor is non-axially displaceably arranged in the screw conveyor cylinder housing the same, that is in the preparation chamber, it is advantageous for the mixing screw conveyor to be axially pressure-resistantly or thrust-resistantly rotatably journalled on, respectively in, a support body, especially a support plate. The support body advantageously forms a part of the aforementioned yoke construction. In this sense, it is further beneficial to construct the preparation chamber, especially the plasticizing chamber, to be releasably connected to a support body, advantageously to the same support body, especially to the support plate.

High functionality and stability with high accuracy and a rapid production sequence as well as maintenance-friendliness is provided in an advantageous embodiment according to which the preparation chamber, especially a plasticizing chamber, forms conjointly with the prolongation of the storage chamber, with the conveying or transport and mixing screw conveyor, especially the plasticizing screw, possibly with its drive means, with the support body, especially the support plate and with the translation motion drive, especially the fluid medium drive connected to the support plate or to the support body, respectively, a preferably releasable construction unit or module. By means of the translation motion drive this releasable construction unit or module is translatably-relatively moveable in relation to a further construction unit or module also connected, preferably releasably connected, with this translation motion drive and in which the mold filling conduit body comprising the mold filling conduit, especially the injection channel, and the support body is connected, preferably releasably connected, with the mold filling conduit body.

If, as also favorably envisioned, the support body supporting the mold filling conduit body, possibly releasably but positionally fixedly, and preferably supporting the support plate, at least during the mold filling procedure, especially during the injection molding procedure, is positionally fixable, a construction is obtained in which the construction unit or module including the preparation chamber, the transport and mixing screw conveyor and its drive as well as its support body is relatively moved in the direction toward the injection channel contacting the mold opening in positionally fixed manner.

The injection molding procedure can be made exactly adaptable to the requirements of mold-filling per se if it is advantageously provided that the preparation chamber, especially the plasticizing chamber, and especially the construction unit or module containing the same, is moveable in relation to the mold filling conduit body, and especially relative to the further construction unit or module containing the same, with adjustable path length and speed. The speed adjustment can comprise its own program for a speed profile of the injection stroke which is exactly correlated to the shape of the molded body to be cast or injection molded.

Substantially no supply of supplementary motion energy or motive power by a hydraulic means or the like is required if the preparation chamber, preferably the plasticizing chamber, and especially the construction unit or module containing the same, is moveable by operation of the transport and mixing screw conveyor promoting or conveying polymer preparation into the storage chamber in a direction away from the mold filling conduit body, especially from the further construction unit or module containing the same. By transporting volumes of the molding mass to be plasticized into the storage chamber, a return translation of the transport and mixing screw conveyor cylinder unit automatically occurs with the preparation chamber in an initial position.

In order to undertake the filling of the storage chamber after an injection molding procedure or operation with the requisite counter-pressure, it has proven advantageous for the fluid medium cylinder of the translation motion drive to comprise a flow-throttlable connection of its working chambers containing fluid medium. If in this case the throttle is placed for slight through-flow, increased pressure is required for filling the storage chamber by means of the transport and mixing screw conveyor.

BRIEF DESCRIPTION OF THE DRAWINGS

The invention will be described in more detail in relation to the single FIGURE of the drawing. This single FIGURE shows a schematic sectional view of an injection molding apparatus or device according to the invention.

DETAILED DESCRIPTION OF THE PREFERRED EMBODIMENTS

Describing now the drawings, it is to be understood that to simplify the showing thereof, only enough of the structure of the injection molding apparatus or device has been illustrated therein as is needed to enable one skilled in the art to readily understand the underlying principles and concepts of the present invention. Turning now specifically to the single FIGURE of the drawing, the injection molding apparatus or device 100 illustrated therein by way of example and not limitation will be seen to comprise a screw conveyor cylinder 30 containing a plasticizing chamber 3 which is releasably connected to a support plate 4. Within the plasticizing chamber 3 there is arranged a conveying or transport and mixing screw conveyor 5 which is rotatable about an axis of rotation a. This transport and mixing screw conveyor 5 defines a plasticizing screw conveyor and is journaled in the support plate 4 by means of an axially thrust-resistant bearing 8. A rotary drive 9 is also arranged on the support body 4 and drivingly cooperates with the transport and mixing screw conveyor 5.

The plasticizing chamber 3 can be supplied through a feed opening or clearing or charging port 35 with a strand or bead 7 of the molding mass to be injected, e.g. with a pre-polymer or polymer possibly containing components or agents for molecular cross-linking. It will be noted that the supply of the molding mass to be injected can also readily take place through a fluid-tight channel, e.g. when, in the fabrication of articles from special silicon rubber or latex, the initial components are present in a substantially fluid state.

By rotating the transport and mixing screw conveyor 5, the strand 7 of the molding mass is transported into the preparation chamber 3 and there subjected to an intensive mixing process and high shear forces by the movement of the flights of the transport and mixing screw conveyor 5, along the inner wall of the preparation chamber 3, while there simultaneously occurs transport or conveying of the molding mass in a direction away from the charging port 35. Due to the shear forces and the working pressure, a substantial heating of the delivered or infed molding mass 7 takes place, so that this molding mass 7 is present in a fluid state 70 at or in the region of the front end of the conveying or transport and mixing screw conveyor 5. At this location, a cross-linking reaction for later hardening or elastomerization can also possibly start.

The cylinder 30 possessing the plasticizing chamber 3 has a prolongation or extension 301 of the same diameter d at its side facing a mold 200 to be filled with the molding mass. The prolongation or extension 301 surrounds a storage chamber 31 connected after or downstream of the plasticizing chamber 3. The storage chamber 31 is substantially delimited or bounded by an inner wall 311 of the prolongation or located at the front end of the conveying or transport and mixing screw conveyor 5 and also by an end surface of a mold injection nozzle 1 having a mold injection conduit or channel 10. The mold injection nozzle 1 is translatably mounted in the storage chamber 31. This mold injection nozzle 1 contactingly bears in a piston-like manner in a pressure-tight fashion at all sides against the inner wall 311 of the prolongation 301. The mold injection nozzle 1 having the injection channel 10 is connected, preferably releasably connected, by means of a collet or holder 22 with a further supporting body 2 and is also operatively connectable by means of its distal end to the mold 200. This mold 200 has a hollow mold chamber or cavity 203.

It is especially preferred, as shown in the single FIGURE of the drawings, for the cylinder 30, the plasticizing chamber 3, the conveying or transport and mixing screw 301, the storage chamber 31, the mold injection nozzle 1 and the mold injection conduit 10 to have a common or joint axis a, since in this manner, the path travelled by the injected molding mass 7, respectively 70, is short. Individual ones or all of the afore-mentioned components advantageously possess means (not particularly illustrated in the single FIGURE of the drawings), for supplying or removing heat in order to ensure an essentially constant temperature which is to be maintained in accordance with the nature of the molding mass to be injected. The mold 200, shown in the single FIGURE of the drawings, which is operatively connectable to the mold injection nozzle 1, possesses a first upper mold half 201 and a second lower mold half 202. The second lower mold half 202 bears against a device 205 for maintaining the temperature constant, for example a heater which is mounted on the support plate or further supporting body 2 of the injection molding device 100. The mold 200 contains a casting or molding channel 204 coaxially arranged and pressure-tightly connectable with respect to the injection channel 10 of the mold injection nozzle 1 and leading to the hollow mold chamber or cavity 203.

In the injection molding apparatus or device 100, the further supporting body or plate 2 supporting the mold injection nozzle 1 is connected by tension anchor elements or piston rods 64 with pistons 63 of the fluid medium drive members 6, preferably hydraulic drives. These piston rods 64 are connected with the further supporting body or plate 2. The cylinders 62 of the fluid medium drive members 6 are connected with the support plate 4 supporting the plasticizing cylinder 30 containing the transport and mixing screw conveyor 5. Both working chambers 60 and 61 of the cylinders 62 are connected via conduits 67 with multiple-way valves 66 and a throttle 65 arranged in the conduits 67 between the working chambers 60 and 61. Supply and removal of pressure medium to not particularly shown suitable apparatus takes place via further conduits 68.

The components of the injection molding apparatus or device 100 which are moveable relative to one another form a construction unit or module comprising the support plate 4 for supporting the plasticizing cylinder 30 with the prolongation or extension 301 and the transport or mixing screw conveyor 5 and also having the rotary drive or screw conveyor 9 and the cylinders 62 of the hydraulic drive 6. This construction unit or module is linearly-relatively moveable toward the further construction unit having the further supporting body 2 connected through the tension anchor elements or piston rods 64 to the pistons 63. The further supporting body 2 carrying the mold filling conduit body or mold injection nozzle 1 and, for instance, at least during the mold filling procedure, bearing against the stationary mold 200, can be stationary. The entire molding apparatus or device 100 is constructed somewhat like a yoke. During the injection molding procedure, the construction unit or module carried by the support plate 4 and connected therewith is moved toward the further construction unit or module carried by the further supporting body or plate 2 while expelling the plasticized molding mass situated in the storage chamber 31 of the prolongation or extension 301 at high pressure, for instance at 2000 bar, through the injection channel 10 into the mold 200 by operating the hydraulic drive. The prolongation 301 is displaced over the piston-like mold filling conduit body or mold injection nozzle 1 slidingly sealingly closing the storage chamber 31 while reducing the volume of this storage chamber 31.

In the single FIGURE of the drawing, the prolongation or extension 301 is represented as being of one piece with the plasticizing cylinder 30 and the dotted line indicates that the latter can also be releasably connected— naturally pressure-tightly—to the plasticizing cylinder 30. Its interior diameter d and therefore the cross sectional area of the storage chamber 31 then exhibit other dimensions and can, for instance, indeed be substantially smaller than the cross-sectional area of the plasticizing chamber 3, so that in the arrangement shown very narrow limits can be set to the volume of the storage chamber 31 at the lower limit. Increasing the size of the afore-mentioned cross-section is unproblematical, so that high flexibility is provided.

While there are shown and described present preferred embodiments of the invention, it is to be distinctly understood that the invention is not limited thereto, but may be otherwise variously embodied and practiced within the scope of the following claims.
ACCORDINGLY,
What I claim is:

1. A device for pressure-aided molding, especially injection molding, of shaped bodies from at least one high-molecular plasticizable molding mass, especially at least one polymer such as synthetic rubber, natural rubber or latex, thermoplastics and the like, preferably of small dimension, comprising:
   a screw conveyor cylinder containing a preparation chamber defining a plasticizing chamber and having at least one prolongation;
   at least one rotatably driven transport and mixing screw conveyor defining a plasticizing screw conveyor arranged within said preparation chamber and having a predetermined transport direction for the at least one plasticizable molding mass and an axis of rotation;
   at least one charging port for filling said preparation chamber with the at least one plasticizable molding mass;
   a prolongation prolonging said screw conveyor cylinder and defining at least one storage chamber for the at least one plasticizable molding mass and arranged subsequent to said preparation chamber as viewed in said predetermined transport direction of said transport and mixing screw conveyor;
   said at least one storage chamber having an inner wall exhibiting substantially mutally parallel generatrices;
   said preparation chamber making a pressure-tight transition into said at least one storage chamber;
   at least one mold injection nozzle defining at least a portion of a mold cavity filling conduit for charging at least one mold cavity of a mold with said at least one plasticizable molding mass;
   said storage chamber opening into said at least one mold cavity filling conduit;
   a drive device comprising a drive means;
   said drive device serving for effecting linear translatory-relative motions of said screw conveyor cylinder containing said preparation chamber and said prolongation defining said at least one storage chamber relative to said at least one mold injection nozzle defining at least said portion of said mold cavity filling conduit; and
   said at least one mold injection nozzle being slidingly, sealingly, substantially linearly translatably moveable within said at least one storage chamber and being connectable to said mold.

2. The device as defined in claim 1, which includes a temperature-regulatable heater.

3. The device as defined in claim 1, wherein:
   all elements of the group comprising said preparation chamber, said at least one rotatably driven transport and mixing screw conveyor, said at least one charging port, said at least one storage chamber and said at least one mold cavity filling conduit are temperature-regulatable.

4. The device as defined in claim 1, wherein:
   said drive means comprises a fluid medium drive means.

5. The device as defined in claim 1, wherein:
   said drive device serves for said translatory-relative motions in the direction of said axis of rotation of said driven transport and mixing screw conveyor.

6. The device as defined in claim 1, wherein:
   said at least one prolongation prolonging said screw conveyor cylinder is formed in one piece with said screw conveyor cylinder.

7. The device as defined in claim 1, wherein:
   said portion of said cavity filling conduit connectable to said mold is connectable to an injection molding channel of said mold.

8. The device as defined in claim 1, wherein:
   said screw conveyor cylinder containing said preparation chamber is path-length adjustably and speed-adjustably moveable relative to said mold injection nozzle.

9. The device as defined in claim 1, wherein:
   said screw conveyor cylinder containing said preparation chamber is moveable away from said mold injection nozzle by operation of said transport and mixing screw conveyor; and
   said operation of said transport and mixing screw conveyor conveying a polymer preparation into said storage chamber.

10. The device as defined in claim 1, wherein:
    said drive device comprises cylinders for a fluid medium;
    said cylinders comprising working chambers for containing said fluid medium; and
    a flow-throttable connection means interconnecting said working chambers.

11. The device as defined in claim 1, further including:
    a rotary drive for the transport and mixing screw conveyor; and
    at least two elements of the elements comprising said transport and mixing screw conveyor, said rotary drive, said preparation chamber, said at least one prolongation, said at least one storage chamber, said mold injection nozzle and said mold cavity filling conduit have a substantially common axis.

12. The device as defined in claim 11, wherein:
    said at least two elements comprise all of the elements comprising said transport and mixing screw conveyor, said rotary drive, said preparation chamber, said at least one prolongation, said at least one storage chamber, said mold injection nozzle and said mold cavity filling conduit.

13. The device as defined in claim 11, wherein:
    said mold cavity filling conduit comprises a mold injection channel.

14. The device as defined in claim 11, wherein:
    said preparation chamber and said transport and mixing screw conveyor conjointly define a direction of longitudinal extent; and
    said preparation chamber and said transport and mixing screw conveyor arranged within said preparation chamber being translatably-relatively immoveable towards each other in said direction of longitudinal extent.

15. The device as defined in claim 14, wherein:
said direction of longitudinal extent coincides with the direction of said axis of rotation.

16. The device as defined in claim 11, wherein:
said preparation chamber and said transport and mixing screw conveyor conjointly define a direction of longitudinal extent; and
said preparation chamber and said transport and mixing screw conveyor arranged within said preparation chamber being translatably-relatively moveable towards each other in said direction of longitudinal extent at most for a single translatably-relative motion of said preparation chamber and said transport and mixing screw conveyor towards each other defining a single closing procedure for preventing return flow of said plasticizable molding mass.

17. The device as defined in claim 16, wherein:
said direction of longitudinal extent coincides with the direction of said axis of rotation.

18. The device as defined in claim 1, wherein:
said preparation chamber has an end region confronting said at least one prolongation of said screw conveyor cylinder; and
said transport and mixing screw conveyor possessing a non-return valve member arranged at said end region of said preparation chamber.

19. The device as defined in claim 18, wherein:
said preparation chamber defining said plasticizing chamber faces said at least one storage chamber thereof.

20. The device as defined in claim 18, wherein:
said non-return valve member comprises a check valve.

21. The device as defined in claim 1, wherein:
said preparation chamber has an end-region confronting said at least one storage chamber thereof;
said transport and mixing screw conveyor having a preparation chamber side; and
a non-return valve member operatively associated with said transport and mixing screw conveyor on said preparation chamber side thereof.

22. The device as defined in claim 21, wherein:
said preparation chamber defining said plasticizing chamber faces said at least one storage chamber thereof.

23. The device as defined in claim 21, wherein:
said non-return valve member comprises a check valve.

24. The device as defined in claim 1, wherein:
said screw conveyor cylinder and said prolongation thereof are removeably connected with each other.

25. The device as defined in claim 24, wherein:
said prolongation of said screw conveyor cylinder has a first inner cross-sectional area;
said preparation chamber having a second inner cross-sectional area; and
said first inner cross-sectional area and said second inner cross-sectional area mutually differing.

26. The device as defined in claim 1, further including:
a support member; and
said transport and mixing screw conveyor being thrust-resistantly rotatably journaled in said support member.

27. The device as defined in claim 26, wherein:
said support member comprises a support plate.

28. The device as defined in claim 1, further including:
a support member; and
said transport and mixing screw conveyor being thrust-resistantly rotatably journaled on said support member.

29. The device as defined in claim 28, wherein:
said support member comprises a support plate.

30. The device as defined in claim 1, further including:
a support member; and
said preparation chamber being removeable connected with said support member.

31. The device as defined in claim 30, wherein: said support member comprises a support plate.

32. The device as defined in claim 1, further including:
a first support member;
a second support member;
a translation motion drive connected to said first support member;
said mold injection nozzle defining said mold cavity filling conduit;
said screw conveyor cylinder having said prolongation thereof and containing said preparation chamber together with said at least one storage chamber, said transport and mixing screw conveyor, said first support member and said drive device connected to said first support member forming a common module;
a further module also connected to said translation motion drive and comprising said mold injection nozzle and said second support member;
said common module being translatably-relatively moveable by means of said translation motion drive relative to said further module.

33. The device as defined in claim 32, further including:
a rotary drive for said transport and mixing screw conveyor forming part of said common module.

34. The device as defined in claim 32, wherein:
said second support member comprises a support plate.

35. The device as defined in claim 32, wherein:
said further module connected to said translation motion drive is removeably connected to said translation motion drive.

36. The device as defined in claim 32, wherein:
said second support member supports said mold injection nozzle and is positionally immobilized at least during a mold filling procedure.

37. The device as defined in claim 32, wherein:
said common module containing said preparation chamber is path-length adjustably and speed-adjustably moveable relative to said mold injection nozzle.

38. The device as defined in claim 32, wherein:
said screw conveyor cylinder containing said preparation chamber is path-length adjustably and speed-adjustably moveable relative to said further module.

39. The device as defined in claim 32, wherein:
said common module containing said preparation chamber is path-length adjustably and speed-adjustably moveable relative to said further module containing said mold injection nozzle.

40. The device as defined in claim 32, wherein:

said common module containing said preparation chamber is moveable away from said mold injection nozzle by operation of said transport and mixing screw conveyor; and said operation of said transport and mixing screw conveyor conveying a polymer preparation into said storage chamber.

41. The device as defined in claim 32, wherein:

said screw conveyor cylinder containing said preparation chamber is moveable away from said further module containing said mold injection nozzle by operation of said transport and mixing screw conveyor; and said operation of said transport and mixing screw conveyor conveying a polymer preparation into said storage chamber.

42. The device as defined in claim 32, wherein:

said common module containing said preparation chamber is moveable away from said further module containing said mold injection nozzle by operation of said transport and mixing screw conveyor; and said operation of said transport and mixing screw conveyor conveying a polymer preparation into said storage chamber.

* * * * *

UNITED STATES PATENT AND TRADEMARK OFFICE
CERTIFICATE OF CORRECTION

PATENT NO. : 4,756,683

DATED : JULY 12, 1988

INVENTOR(S) : BRUNO SVOBODA

It is certified that error appears in the above-identified patent and that said Letters Patent is hereby corrected as shown below:

Column 1, line 15, please delete "massive" and insert --masses--

Column 7, line 49, after "or" please insert --extension 301 and by a non-return valve seat member 52--

Column 7, line 66, after "screw" please insert --conveyor 5, its rotary drive 9, the cylinder prolongation--

Column 10, line 41, please delete "throttable" and insert --throttlable--

Signed and Sealed this

Third Day of January, 1989

Attest:

DONALD J. QUIGG

Attesting Officer

Commissioner of Patents and Trademarks